(No Model.)

P. T. CAMPBELL & W. H. PICKETT.
OIL PUMP.

No. 430,919. Patented June 24, 1890.

Witnesses:
Robt Everett
J. A. Rutherford

Inventors,
Patterson T. Campbell
William H. Pickett.
By
James L. Norris.
Atty.

UNITED STATES PATENT OFFICE.

PATTERSON T. CAMPBELL AND WILLIAM H. PICKETT, OF WARREN, PENNSYLVANIA.

OIL-PUMP.

SPECIFICATION forming part of Letters Patent No. 430,919, dated June 24, 1890.

Application filed January 13, 1890. Serial No. 336,731. (No model.)

*To all whom it may concern:*

Be it known that we, PATTERSON T. CAMPBELL and WILLIAM H. PICKETT, citizens of the United States, residing at Warren, in the county of Warren and State of Pennsylvania, have invented new and useful Improvements in Oil-Pumps, of which the following is a specification.

Our invention relates to that class of mechanism for pumping oil-wells.

It is our object to provide means whereby the upper and lower valves may be so connected together that when repairs are needed in the lower valve it may be removed, together with the upper valve, by means of a simple sliding or other connection, and the necessity thereby avoided of removing the tubing from the well.

It is a further purpose of our invention to combine with a pumping-rig for oil-wells means whereby the paraffine, with which the oil-rock or sand soon becomes coated, may be dissolved and removed by spraying or flooding it with oil.

The invention consists to these ends in certain novel features of construction and new combinations of parts, hereinafter fully described, and then more definitely pointed out in the claims following this specification.

To enable others skilled in the art to practice our said invention, we will now describe the same in detail, reference being had to the accompanying drawings, in which—

Figure 1:
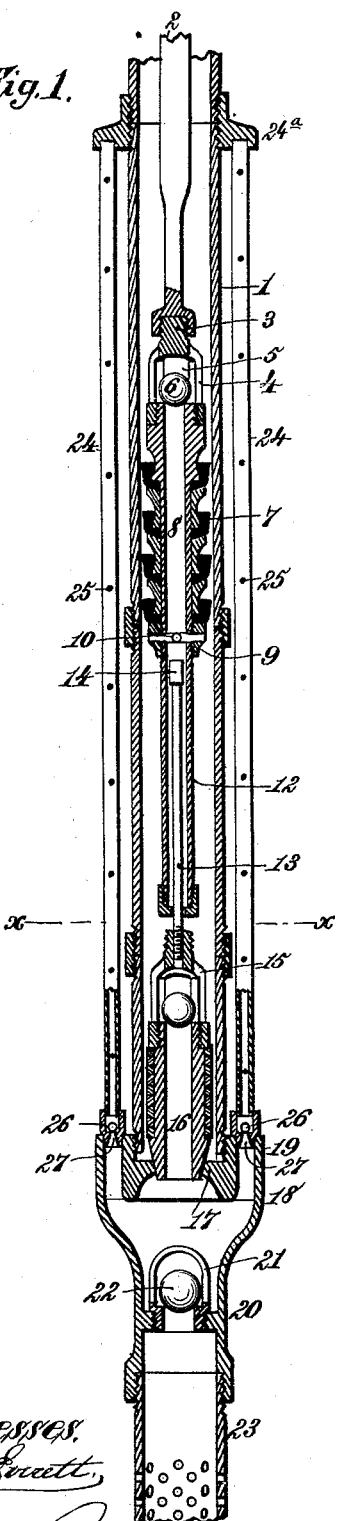
Figure 2:
Figure 3:
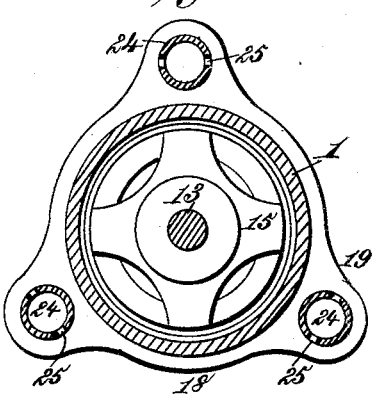

Figure 1 is a central longitudinal section illustrating said invention. Fig. 2 is a sectional elevation of the upper and lower valves with their connections. Fig. 3 is a transverse section taken on the line $x$ $x$ of Fig. 1.

In the said drawings the reference-numeral 1 designates the well-tube, which is formed in sections and connected in the manner well known in the art. In this tubing is arranged the sucker-rod or polished rod 2, which is reciprocated by the walking-beam or other mechanism at the mouth of the well. This polished rod is connected by a threaded joint to the nipple 3 of the upper valve 4, which is provided with a cage 5, containing the check-valve 6. This cage rises above a series of annular packings 7, surrounding the tubular section 8, the lower end of which has a sleeve or union 9, provided with apertures 10, whereby oil may flow from the interior of the tubing 1 to the interior of the tubular section 8, passing thence through the openings of the cage 5 to the interior of the tubing above the upper valve.

Screwed or otherwise connected with the upper valve is a small tube 12, tapped into or connected with the sleeve or union 9 between the tubular section 8 and the tube 12. The lower end of this tube is closed, save as to an aperture through which passes a rod 13, having upon its inwardly-contained end a head or nipple 14, which rises and falls in the tube, but may not escape therefrom. The rod 13, which passes through the lower end of this tubing 12, is tapped into or otherwise secured to the cage 15 of the lower valve, which is prolonged downward and provided with a tubular portion 16, which at its lower open end seats upon a valve-seat 17 formed in a lower enlarged section, hereinafter described, which is attached to the lower end of the tubular section 1.

Surrounding the lower extremity of the tubing is a section 18 into which the tubing 1 is tapped, and in which the valve-seat 17 is formed. Surrounding and forming part of this section is an enlargement 19, which is contracted below to form a neck 20, in which is a valve-cage 21, containing a check-valve 22. To this neck is connected the perforated pipe 23, of the usual construction.

We may dispense with the circular enlargement 19 and substitute therefor two, three, or more radial pipes tapped into the enlargement and communicating with the pipes 24, running parallel with the tubing 1, and rising to a suitable height above the upper valve, their closed upper ends being held or braced by a support 24ª. These pipes are provided with numerous perforations 25 for a purpose to be set forth. In the lower ends of these pipes are placed check-valves 26, which close downward upon valve-seats 27.

When repairs to the valves are needed, it is necessary to pull or withdraw them from the tube, and heretofore, no connection having been made between the working-valve and the standing valve, it has usually been necessary to pull up the pipe to obtain access to the latter. By our invention, however, both valves may be withdrawn together, and the removal of the tubing is wholly avoided. By simply drawing up the polished rod or sucker-rod the upper valve is removed, and by the sliding connection between it and the lower or standing valve the latter is also withdrawn at the same time.

After a well has been pumped for a certain period the oil-producing rock or stratum frequently becomes coated with paraffine, and it is necessary, and is usually a material benefit to the well, to remove this paraffine. To effect this we raise the lower or standing valve 16 by means of the connecting-rod, whereby the oil in the tube rushes down through the valve-seat, and, being retained by the check-valve 22, it is forced up through the smaller tubes 24 and ejected through the perforations 25 therein, whence it is sprayed over the paraffine, which is dissolved and removed thereby.

What we claim is—

1. In an oil-well pump, the combination, with the well-tube, of a reciprocating tubular section carrying at its upper portion the working-valve, provided with packing on its exterior working against the interior of the well-tube, and having below the packing a series of lateral inlet-orifices for the passage of the oil from the well-tube into the said tubular section, a depending extension from the tubular section below the lateral oil-inlet orifices therein, and a standing valve having a loose connection with the depending extension, substantially as described.

2. In an oil well pump, the combination, with the well-tube, of a reciprocating tubular section carrying at its upper end the working-valve, provided with packing on its exterior working against the interior of the well-tube and having below the packing a series of lateral inlet-orifices for the passage of oil from the well-tube into the said tubular section, a depending tube-extension from the tubular section below the lateral oil-inlet orifices therein, and a standing valve having a slide-rod connection with the depending tube-extension, substantially as described.

3. In an oil-well pump, the combination, with the well-tube, of a reciprocating tubular section carrying at its upper end the working-valve and provided with annular packings on its exterior working against the interior of the well-tube, a sleeve attached to the lower end of the tubular section below the packings thereupon and having lateral inlet-orifices for the passage of oil from the well-tube into the tubular section, a tube secured to and depending from the sleeve, and a standing valve having a rod entering said depending tube and on which the latter slides, substantially as described.

4. In an oil-pump, the combination, with the pump-barrel, of perforated pipes arranged around and parallel therewith, their lower ends communicating with said barrel below the standing valve, and their upper ends closed, a check-valve below the standing valve, and a connection between the working and the standing valve whereby the latter may be unseated to allow the oil to flow from the tube to and through the perforated pipes to spray the paraffine, substantially as described.

5. In an oil-pump, the combination, with the pump-barrel, of a chamber at the lower end thereof with which said barrel communicates, a series of perforated pipes communicating with said chamber parallel with the pump-barrel, and an adjustable tubular plug carrying a valve-cage and valve and closing the connection between the interior of the pump-barrel and the chamber below, and a check-valve beneath the plug, substantially as described.

6. In an oil-pump, the combination, with the pump-barrel, of a series of perforated pipes parallel therewith and with one another and communicating with a space containing a check-valve below said barrel, an adjustable tubular plug having a cage for the check-valve and shutting off communication between the interior of the pump-barrel and the space below the same, and means for unseating the tubular plug to spray oil through the perforated pipes, substantially as described.

In testimony whereof we have affixed our signatures in presence of two witnesses.

PATTERSON T. CAMPBELL.
WILLIAM H. PICKETT.

Witnesses:
JAMES W. KITCHEN,
SAMUEL B. RISHER.